United States Patent Office 3,424,732
Patented Jan. 28, 1969

3,424,732
PROCESS FOR PREPARING PERFLUOROALKYL AND ω - CHLOROPERFLUOROALKYL - 3 - ACYLOXY - 1,3 - BUTADIENES AND PRODUCTS AND POLYMERS THEREOF
William J. Middleton, Wilmington, Del., assignor to E. I. du Pont de Nemours and Company, Wilmington, Del., a corporation of Delaware
No Drawing. Filed Nov. 22, 1965, Ser. No. 509,174
U.S. Cl. 260—82.1                6 Claims
Int. Cl. C07c 69/14; C08f 3/52, 15/16

This application relates to novel acyloxy-1,3-butadienes, to a process for their preparation and to polymers therefrom.

The monomeric compounds of this invention are perfluoroalkyl and ω-chloroperfluoroalkyl-3-acyloxy-1,3-butadienes having the general formula (1) 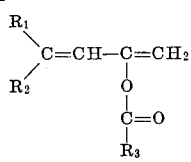

wherein $R_1$ and $R_2$ taken separately can be the same or different and represent perfluoroalkyl or ω-chloroperfluoroalkyl containing 1 to 4 carbon atoms, $R_1$ and $R_2$ taken together represent perfluoroalkylene containing 3 to 5 carbon atoms, and $R_3$ is a saturated aliphatic or aromatic hydrocarbyl group selected from the group consisting of alkyl containing 1 to 10 carbon atoms, aralkyl containing 7 to 14 carbon atoms, aryl containing 6 to 14 carbon atoms, and alkylaryl containing 7 to 14 carbon atoms. These monomers can be homopolymerized and copolymerized with copolymerizable monomers containing ethylenic unsaturation having the general formula

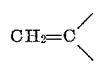

It has been found that the compounds of Formula 1 can be prepared by pyrolysis of the esters of 4,4-bis(perfluoroalkyl)-4-hydroxy-1,2-butadiene and 4,4-bis(ω-chloroperfluoroalkyl)-4-hydroxy-1,2-butadiene having the general formula (2) $$R_3\overset{O}{\underset{\|}{C}}-O-\overset{R_1}{\underset{R_2}{C}}-CH=C=CH_2$$

wherein $R_1$, $R_2$, and $R_3$ are the same as described above.

Three reactions are to considered with the process embodiment of this invention: (1) the "methylacetylene reaction" which is illustrated by the following equation (3) 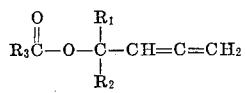

(2) the "esterification reaction" in which the 4-hydroxy-1,2-butadiene produced by the methylacetylene reaction" is acylated; the "esterification reaction" is illustrated by the following equation (4) 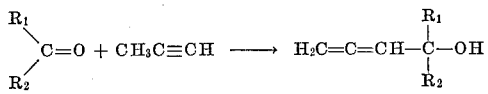

wherein X is selected from the group conisting of halogen and acyloxy and B is a basic substance selected from the group of alkali metals, alkaline-earth metals, alkali-metal hydrides, alkaline-earth-metal hydrides, alkali-metal amides, alkaline-earth-metal amides, lower alkyl alkali-metal compounds and lower alkyl alkaline-earth-metal compounds and (3) the "pyrolysis reaction" of the ester produced in the esterification reaction as illustrated by the equation (5) 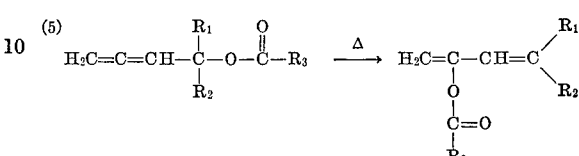

where $R_1$, $R_2$ and $R_3$ are as described above.

In carrying out the "methylacetylene reaction" according to process of this invention, fluorinated ketones are heated at 100–200° C. with less than stoichiometric amounts to greater than stoichiometric amounts of methylacetylene, but best results are obtained with at least a molar excess of methylacetylene. The reaction is usually carried out for a period of time of 10–100 hours. Autogenous pressures are used. The "methylacetylene reaction" product is separated from the reaction mixture by conventional distillation and crystallization techniques. In order to obtain optimum yields of 1,2-butadienes, the "methylacetylene reaction" is carried out in the presence of a free-radical scavenger such as polyhydric phenols, for example, hydroquinone, catechol and tert-butyl-catechol; quinones, for example, benzoquinone, naphthoquinone, choranil, and 9,10-phenanthrenequinone; and substituted aromatic amines, for example, hydroxydimethylaniline, nitrosodimethylaniline, phenothiazine and 4-hydroxy-1-naphthylamine.

Among the perfluoroalkyl and the ω-chloroperfluoroalkyl acyclic ketones, and perfluoro cyclic aliphatic ketones used in the methylacetylene reaction are: perfluoroacetone, perfluorobutanone-2, perfluoropentanone-2, perfluoropentanone-3, perfluorocyclobutanone, perfluorocyclopentanone, perfluorocyclohexanone, bis(chlorodifluoromethyl)ketone, bis(β-chlorotetrafluoroethyl)ketone and other omega chloroperfluoroalkyl acyclic ketones.

In carrying out the "esterification reaction" according to process of this invention, the 1,2-butadiene prepared by the "methylacetylene reaction" is dissolved in an aprotic solvent such as dimethoxyethane (glyme), diethyl ether or tetrahydrofuran containing a basic substance selected from the group of alkali metals of Group IA of the Periodic Table of Elements,[1] alkaline-earth metals of Group IIA of the Periodic Table of Elements and derivatives of said alkali and alkaline-earth metals such as alkali and alkaline-earth hydrides, alkali and alkaline-earth amides, and lower alkyl alkali and alkaline-earth organic compounds. Examples of these basic substances are lithium, sodium, potassium, lithium hydride, rubidium hydride, lithium amide, sodium amide, isobutyllithium, methylsodium, ethylcesium and methylmagnesium halide. For best results, a suspension of the alkali hydrides or alkaline-earth hydrides in an aprotic solvent is used.

Among the acylating agents suitable for the "esterification reaction" are: carboxylic acid anhydrides and carboxylic acid halides derived from aliphatic carboxylic acids containing up to 10 carbon atoms such as acetic, propionic, n-butyric, isobutyric, pentanoic, hexanoic, heptanoic, octanoic, nonanoic and decanoic acid; derived from aralkanecarboxylic acids containing 7 to 14 carbon ---
[1] The Periodic Table referred to herein is that set forth in Deming's General Chemistry, John Wiley & Sons, Inc., 5th ed., Chapter 1.

atoms such as α-phenylacetic, α-phenylpropionic, β-phenylpropionic, α-phenyl-n-butyric, β-phenyl-n-butyric, γ-phenyl-n-butyric, and corresponding aralkanecarboxylic acids wherein the aryl group is alkyl substituted such as tolylmethyl and xylylmethyl; and aromatic and alkyl and aryl substituted aromatic carboxylic acids containing 6 to 14 carbon atoms such as benzoic, α-naphthoic, β-naphthoic, o-toluic, m-toluic, p-toluic, and phenylbenzoic acid. The above carboxylic halides are fluorides, chlorides, bromides, or iodides.

In general, the acylating agent is added to the reaction mixture at a temperature of from −10 to +100° C. The ester is isolated by conventional means, for example, by washing with water until the water layer is neutral to litmus paper followed by distillation of the organic layer at atmospheric or less than atmospheric pressures.

In carrying out the "pyrolysis reaction" according to the process of this invention, the ester produced in the "esterification reaction" is heated to 400–600° C. by passing it through a heated tube at autogenous pressures of subatmospheric to +50 atmospheres. The pyrolysis is conducted in a metallic or ceramic tube, said tube being constructed from metals such as platinum, copper, stainless steel, and nickel and in ceramics, for example, high silica containing glasses.

The monomeric compounds of this invention can be homopolymerized and copolymerized in bulk, in solution, or in emulsion by free-radical initiation. Initiation may be accomplished by the use of conventional free-radical organic and inorganic peroxy and aliphatic azo initiators such as isopropyl peroxycarbonate; acetyl, lauroyl, and benzoyl peroxide; ammonium persulfate or hydrogen peroxide-reducing agent mixtures, which are commonly known as "redox" systems; and 2,2′-azobisisobutyronitrile and related azo initiators. Chain transfer agents such as mercaptans, which are molecular weight modifiers may be used in free-radical polymerizations when control of the molecular weight of the polymer is desired. Initiation using ionic initiators such as $BF_3$, may also be used. The initiators are employed in the usual concentration range of 0.01 to 10% of the weight of the monomer being polymerized.

Suitable copolymerizable monomers containing ethylenic unsaturation are vinyl containing compounds such as, styrene, vinyl chloride, vinyl acetate, methyl acrylate, methyl methacrylate, acrylonitrile, vinyltoluene; aliphatic conjugated dienes such as 1,3-butadiene, chloroprene, isoprene, and vinylidene containing compounds such as vinylidene chloride and fluoride.

The proportion of the monomeric compounds of this invention in these copolymers is preferably 5 to 85 weight percent, but any proportion may be used.

The following examples further illustrate the invention in greater detail.

EXAMPLE I (A) 4-hydroxy-5,5,5-trifluoro-4-trifluoromethyl-1,2-pentadiene

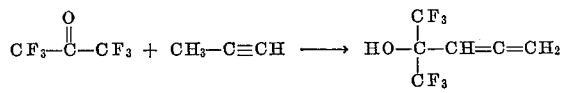

A 400 ml. stainless-steel bomb charged with 100 g. of methylacetylene, 100 g. of hexafluoroacetone, and 1 g. of hydroquinone was heated at 150° C. for 48 hours with agitation. The bomb was cooled and vented, and the residue was distilled to give 70.5 g. (57%) of 4-hydroxy-5,5,5-trifluoro-4-trifluoromethyl-1,2-pentadiene as a colorless oil, B.P. 105–106° C., $n_D^{25}$ 1.3477. The infrared spectrum contains bands at 5.03μ and 5.09μ for the allene (C=C=C) group.

Analysis.—Calcd. for $C_6H_4F_6O$: C, 34.97; H, 1.96; F, 55.35. Found: C, 35.41; H, 2.16; F, 55.23.

(B) 4-acetoxy-5,5,5-trifluoro-4-trifluoromethyl-1,2-pentadiene

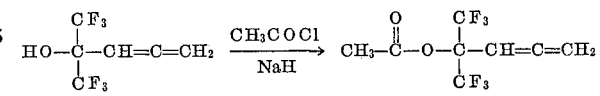

4-hydroxy-5,5,5-trifluoro-4-trifluoromethyl-1,2-pentadiene, 20.6 g., was added dropwise with stirring to a suspension of 4.5 g. of 54% sodium hydride (in mineral oil) in 100 ml. of 1,2-dimethoxyethane. The reaction mixture was cooled in an ice bath and then 7.9 g. of acetyl chloride was added dropwise with stirring. The mixture was poured into 200 ml. of water and the lower layer that formed was separated, washed with water, and dried over magnesium sulfate. Distillation gave a yield of 22.2 g. as a colorless liquid, B.P. 135–136°, $n_D^{25}$ 1.3668. The infrared spectrum contained bands at 5.55, 5.01 and 5.09μ.

Analysis.—Calcd. for $C_8H_6F_6O_2$: C, 38.72; H, 2.44; F, 45.95. Found: C, 38.77; H, 2.52; F, 44.63.

(C) 5,5,5-trifluoro-4-trifluoromethyl-2-acetoxy-1,3-pentadiene

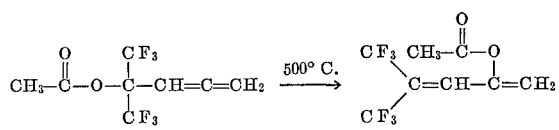

4-Acetoxy-5,5,5-trifluoro-4-trifluoromethyl-1,2-pentadiene, 14 g., was added dropwise under a nitrogen atmosphere over a period of 1 hour into a 0.5 in. diameter silica glass tube heated to a temperature 500°±5° C. and inclined at a 45° angle and the pyrolysate was collected in a cooled trap. Distillation of the pyrolysate through a spinning band column gave 8.0 g. (57%) of 5,5,5-trifluoro-4-trifluoromethyl-2-acetoxy-1,3-pentadiene as a colorless liquid, B.P. 66–68° C. at 22 mm. Hg. The infrared spectrum showed one carbonyl and two C=C bands. The proton magnetic resonance spectrum showed a singlet at 2.13 p.p.m. (area 3), a multiplet at 5.52 p.p.m. (area 2), and a broad absorption at 674 p.p.m. (area 1) from $(CH_3)_4Si$ used as an internal reference The fluorine-19 magnetic resonance spectrum showed a pair of quartets (J=7.5 c.p.s.) at −2.04 and −9.13 p.p.m. from the resonance of $CFCl_2CFCl_2$ used as an external reference.

Analysis.—Calcd. for $C_8H_6O_2F_6$: C, 38.71; H, 2.44; F, 45.94. Found: C, 39.29; H, 2.90; F, 45.34.

EXAMPLE II

Poly(5,5,5-trifluoro-4-trifluoromethyl-2-acetoxy-1,3-pentadiene)

A 750-mg. sample of 5,5,5-trifluoro-4-trifluoromethyl-2-acetoxy-1,3-pentadiene was placed in a dry, heavy-walled glass tube and 10 mg. of 2,2′-azobisisobutyronitrile was added. The tube was evacuated and flushed several times with nitrogen, sealed, and then heated to 60° C. in a water bath. When the liquid began to cloud, the heating was discontinued by removing the bath. The suspension that formed was allowed to stand for 17 hours at room temperature. The white polymer that formed was collected on a filter washed with methanol and dried. A clear colorless film was pressed at 210° C. and 10,000 lbs. ram pressure. The infrared spectrum of this film showed bands at 5.63μ and 5.97μ.

Analysis.—Calcd. for $(C_8H_6F_6O_2)_n$: C, 38.71; H, 2.44; F, 45.94. Found: C, 38.69; H, 2.72; F, 45.62.

EXAMPLE III

Poly(5,5,5-trifluoro-4-trifluoromethyl-2-acetoxy-1,3-pentadiene)

A solution of 3.7 g. of 5,5,5-trifluoro-4-trifluoromethyl-2-acetoxy-1,3-pentadiene in 30 ml. of 1,1,2-trichloro-1,2, 2-trifluoroethane containing 10 mg. of benzoyl peroxide was heated in a closed 80-ml. stainless steel reactor at 90° C. for 16 hours. The reaction mixture was cooled, and the solid polymer that had formed (3.0 g.) was collected on a filter and dried. A thermal gravimetric analysis of the polymer showed that it lost 5% of its weight when heated to 316° C. at a rate of 6°/min.

EXAMPLE IV

Poly(5,5,5-trifluoro-4-trifluoromethyl-2-acetoxy-1,3-pentadiene)

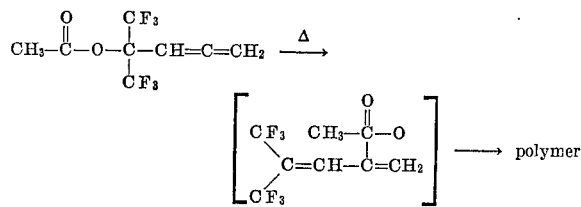

4 - Acetoxy - 5,5,5 - trifluoro - 4 - trifluoromethyl - 1,2-pentadiene, 15.1 g., (0.062 mole) was added dropwise through a ½″ platinum tube inclined at a 30° angle and heated over 12″ to 500°±10° C. The pyrolysate was condensed in a trap cooled by ice. The clear yellow liquid that was obtained was heated to 80–100° C., at which temperature it solidified. The solid polymer was shredded in a blender with water, washed with water, and dried in a vacuum at 50° C. There was obtained 6.5 g. of poly(5, 5,5 - trifluoro - 4 - trifluoromethyl - 2 - acetoxy - 1,3-pentadiene), as a white powder, which melted above 220° C. A transparent flexible film was pressed from this power at 210° C. and 10,000 lbs. ram pressure. This film was resistant to most common organic solvents, including acetone, ethanol, ethyl acetate, benzene, toluene, chloroform, carbon tetrachloride, hexane, N,N-dimethylformamide, dimethyl sulfoxide, and methylene chloride.

*Analysis.*—Calcd. for $(C_8H_6F_6O_2)_n$: C, 38.72; H, 2.44; F, 45.95. Found: C, 37.49; H, 2.59; F, 44.70.

The monomeric compounds of this invention are useful for preparing plastics that can be transformed into manufactured articles. These plastics are particularly useful in preparing molded articles that come in contact with organic liquids such as oils, gasoline and dry cleaning solvents because of their resistance to most common organic solvents.

The foregoing detailed description has been given for clearness of understanding only and no unnecessary limitations are to be understood therefrom. The invention is not limited to the exact details shown and described since obvious modifications will occur to those skilled in the art.

The embodiments of the invention in which an exclusive property or privilege is claimed are defined as follows:

1. A compound of the formula

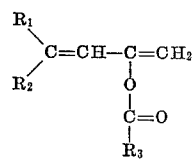

wherein $R_1$ and $R_2$ taken separately can be the same or different and are selected from the class consisting of perfluoroalkyl and ω-chloroperfluoroalkyl containing 1 to 4 carbon atoms, $R_1$ and $R_2$ taken together is perfluoroalkylene containing 3 to 5 carbon atoms, and $R_3$ is a saturated aliphatic or aromatic hydrocarbyl group selected from the class consisting of alkyl containing 1 to 10 carbon atoms, aralkyl containing 7 to 14 carbon atoms, aryl containing 6 to 14 carbon atoms, and alkylaryl containing 7 to 14 carbon atoms.

2. The compound of claim 1, 5,5,5-trifluoro-4-trifluoromethyl-2-acetoxy-1,3-pentadiene.

3. Process for preparing a compound of claim 1 by pyrolyzing at temperatures of 400–600° C. at autogenous pressure a compound of the formula

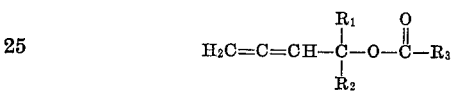

wherein $R_1$, $R_2$, and $R_3$ are as defined in claim 1.

4. Process for preparing the compound of claim 2 by pyrolyzing 5,5,5 - trifluoro - 4 - trifluoromethyl - 4 - acetoxy-1,2-pentadiene conducted at temperatures of 400–600° C.

5. A solid synthetic polymer selected from the group consisting of homopolymers and copolymers of the compounds of claim 1 and ethylenically unsaturated compounds having the general formula

6. The solid synthetic polymers of claim 5 selected from the group consisting of poly(5,5,5 - trifluoro - 4-trifluoromethyl - 2 - acetoxy - 1,3 - pentadiene), copolymers of 5,5,5 - trifluoro - 4 - trifluoromethyl - 2 - acetoxy-1,3-pentadiene and chloroprene, copolymers of 5,5,5-trifluoro - 4 - trifluoromethyl - 2 - acetoxy - 1,3 - pentadiene and styrene, and copolymers of 5,5,5-trifluoro-4-trifluoromethyl-2-acetoxy-1,3-pentadiene and vinylidene fluoride.

References Cited

UNITED STATES PATENTS 2,418,708   4/1947   Gwynn et al. _____ 260—488

JOSEPH L. SCHOFER, *Primary Examiner.*

J. A. DONAHUE, *Assistant Examiner.*

U.S. Cl. X.R.

260—83.7, 87.7, 87.5, 87.1, 488, 476, 491